United States Patent
Gaither (10) Patent No.: US 10,040,453 B2
(45) Date of Patent: Aug. 7, 2018

(54) SYSTEMS AND METHODS FOR PREEMPTIVELY MODIFYING VEHICLE PARAMETERS ACCORDING TO PREDICTED ACCELERATIONS UPON A TRAVEL LANE CLEARING

(71) Applicant: Toyota Motor Engineering & Manufacturing North America, Inc., Erlanger, KY (US)

(72) Inventor: Geoffrey David Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/431,281

(22) Filed: Feb. 13, 2017

(65) Prior Publication Data

US 2018/0134295 A1    May 17, 2018

Related U.S. Application Data

(60) Provisional application No. 62/423,405, filed on Nov. 17, 2016.

(51) Int. Cl.
*B60W 30/00* (2006.01)
*B60W 30/14* (2006.01)
(Continued)

(52) U.S. Cl.
CPC .......... *B60W 30/146* (2013.01); *B60W 20/10* (2013.01); *B60W 50/06* (2013.01);
(Continued)

(58) Field of Classification Search
CPC .... B60W 30/146; B60W 20/10; B60W 50/06; B60W 2050/0014; B60W 2420/52;
(Continued)

(56) References Cited

U.S. PATENT DOCUMENTS

6,678,603 B2    1/2004   Egawa et al.
8,359,149 B2    1/2013   Shin
(Continued)

*Primary Examiner* — Marthe Y Marc-Coleman
(74) *Attorney, Agent, or Firm* — Christopher G. Darrow; Darrow Mustafa PC (57) ABSTRACT

System, methods, and other embodiments described herein relate to preemptively modifying operation of a trailing vehicle according to predicted acceleration inputs. In one embodiment, a method includes, in response to identifying that a lane ahead of the trailing vehicle has cleared of a leading vehicle, determining an acceleration profile for the trailing vehicle that indicates a predicted acceleration that is anticipated to be provided by a driver as a function of an environmental context. The environmental context characterizes at least current surroundings of the trailing vehicle. The method includes adjusting operating parameters of the trailing vehicle according to the acceleration profile to preemptively optimize the trailing vehicle in anticipation of an acceleration input from the driver that correlates with the predicted acceleration. The method includes controlling the trailing vehicle to accelerate based, at least in part, on the operating parameters upon receiving the acceleration input.

20 Claims, 5 Drawing Sheets

(51) Int. Cl.
*B60W 20/10* (2016.01)
*B60W 50/06* (2006.01)
*B60W 50/00* (2006.01)

(52) U.S. Cl.
CPC . *B60W 2050/0014* (2013.01); *B60W 2420/52* (2013.01); *B60W 2520/10* (2013.01); *B60W 2550/306* (2013.01); *B60W 2550/402* (2013.01); *B60W 2550/406* (2013.01); *B60W 2720/10* (2013.01); *B60W 2750/302* (2013.01); *B60W 2750/306* (2013.01); *B60W 2750/308* (2013.01)

(58) Field of Classification Search
CPC ....... B60W 2520/10; B60W 2550/306; B60W 2550/402; B60W 2550/406; B60W 2720/10; B60W 2750/302; B60W 2750/306; B60W 2750/308

USPC ............ 701/93, 96, 301; 340/903, 435, 436; 342/70, 455

See application file for complete search history.

(56) References Cited

U.S. PATENT DOCUMENTS

| | | | |
|---|---|---|---|
| 8,862,342 | B2 | 10/2014 | Oguri et al. |
| 9,159,023 | B2 | 10/2015 | Bone et al. |
| 2009/0248270 | A1* | 10/2009 | Sekiguchi ............. B60W 10/06 701/96 |
| 2012/0022764 | A1 | 1/2012 | Tang et al. |
| 2012/0095254 | A1* | 4/2012 | Hathaway, Jr. ...... B01J 19/1881 560/186 |
| 2015/0274029 | A1* | 10/2015 | Tanaka ..................... B60L 7/18 701/22 |
| 2015/0291146 | A1 | 10/2015 | Prakah-Asante et al. |
| 2017/0217428 | A1* | 8/2017 | Tan ..................... B60W 30/025 |

* cited by examiner

SYSTEMS AND METHODS FOR PREEMPTIVELY MODIFYING VEHICLE PARAMETERS ACCORDING TO PREDICTED ACCELERATIONS UPON A TRAVEL LANE CLEARING

CROSS REFERENCE TO RELATED APPLICATIONS

This application claims benefit of U.S. Provisional Application No. 62/423,405, filed on Nov. 17, 2016, which is herein incorporated by reference in its entirety.

TECHNICAL FIELD

The subject matter described herein relates in general to systems for preemptively modifying vehicle parameters according to predicted accelerations of the driver and, more particularly, to preemptively modifying the parameters upon detecting that a lane ahead of the vehicle has cleared after following another vehicle.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Motor vehicles are generally tuned or otherwise configured to operate according to received control inputs. A driver/operator provides the control inputs using interface devices, such as a steering wheel, pedals, etc. Accordingly, the vehicle receives the control inputs from the driver as the driver reacts to changing conditions while driving. However, because the driver generally operates the vehicle reactively according to changing conditions along a route, the provided inputs are also reactive. Thus, the vehicle brakes, accelerates, steers, shifts, and so on as the inputs are received in a reactive manner that may not be an optimal mode of operation. In other words, because the vehicle controls various systems in response to the driver inputs, the systems are not primed or otherwise optimized to perform a particular task. Instead, the vehicle systems are tuned to operate in a generalized manner so as to provide an acceptable, but not optimized response according to a wide array of possible inputs. As a result, the vehicle may suffer from difficulties such as reduced fuel economy, degraded safety, reduced performance, and so on.

SUMMARY

An example of a predictive acceleration system that preemptively modifies operating parameters of a vehicle in anticipation of predicted acceleration inputs is presented herein. In one embodiment, the predictive acceleration system detects when the vehicle is following another vehicle and, thus, is traveling at a speed that is restrained from an intended speed. Accordingly, the predictive acceleration system anticipates an acceleration input of the vehicle according to a detected clearing of a lane ahead and using information about, for example, how long the vehicle was traveling at the restrained speed behind the other vehicle. In this way, the predictive acceleration system optimizes operating aspects of the vehicle in anticipation of acceleration inputs instead of reactively responding to the acceleration inputs.

In one embodiment, a predictive acceleration system of a trailing vehicle is disclosed. The predictive acceleration system includes one or more processors and a memory communicably coupled to the one or more processors. The memory stores a context module including instructions that when executed by the one or more processors cause the one or more processors to, in response to identifying that a lane ahead of the trailing vehicle has cleared of a leading vehicle, determine an acceleration profile for the trailing vehicle that indicates a predicted acceleration that is anticipated to be provided by a driver as a function of an environmental context. The environmental context characterizes at least current surroundings of the trailing vehicle. The predictive acceleration system includes a control module including instructions that when executed by the one or more processors cause the one or more processors to adjust operating parameters of the trailing vehicle according to the acceleration profile to preemptively optimize the trailing vehicle in anticipation of an acceleration input from the driver that correlates with the predicted acceleration. The control module includes instructions to control the trailing vehicle to accelerate based, at least in part, on the operating parameters upon receiving the acceleration input.

In one embodiment, a non-transitory computer-readable medium is disclosed. The computer-readable medium stores instructions that when executed by one or more processors cause the one or more processors to perform the disclosed functions. The instructions include instructions to, in response to identifying that a lane ahead of the trailing vehicle has cleared of a leading vehicle, determine an acceleration profile for a trailing vehicle that indicates a predicted acceleration that is anticipated to be provided by a driver as a function of an environmental context. The environmental context characterizes at least current surroundings of the trailing vehicle. The instructions include instructions to adjust operating parameters of the trailing vehicle according to the acceleration profile to preemptively optimize the trailing vehicle in anticipation of an acceleration input from the driver that correlates with the predicted acceleration. The instructions include instructions to control the trailing vehicle to accelerate based, at least in part, on the operating parameters upon receiving the acceleration input.

In one embodiment, a method of preemptively adjusting operating parameters of a trailing vehicle is disclosed. The method includes, in response to identifying that a lane ahead of the trailing vehicle has cleared of a leading vehicle, determining an acceleration profile for the trailing vehicle that indicates a predicted acceleration that is anticipated to be provided by a driver as a function of an environmental context. The environmental context characterizes at least current surroundings of the trailing vehicle. The method includes adjusting the operating parameters of the trailing vehicle according to the acceleration profile to preemptively optimize the trailing vehicle in anticipation of an acceleration input from the driver that correlates with the predicted acceleration. The method includes controlling the trailing vehicle to accelerate based, at least in part, on the operating parameters upon receiving the acceleration input.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with preemptively adjusting vehicle systems according to predicted accelerations are disclosed. As mentioned in the background, a vehicle often fails to efficiently operate various vehicle systems because the vehicle reactively controls the vehicle systems according to driver inputs as the inputs are received. However, using technologies such as proximity sensors, radar and/or other sensors in addition to the integration of computing systems with a vehicle, the vehicle may preemptively adjust systems to operate optimally according to particular circumstances.

For example, in one embodiment, a predictive acceleration system uses various sensor inputs (e.g., camera monitoring, proximity sensors, etc.) to identify a current driving environment of the vehicle so that the vehicle systems can be preemptively optimized according to anticipated driver behaviors. Thus, when the predictive acceleration system identifies a circumstance such as the vehicle trailing another vehicle at a current speed that is below the speed limit, the predictive acceleration system can modify operating parameters of the vehicle to optimize a predicted upcoming acceleration. That is, the system identifies a current context of the vehicle and the system anticipates likely control inputs (e.g., strong acceleration) from the driver according to the context. Additionally, the system may also account for learned behaviors of the driver in that particular context. As a result of knowing the context and being able to predict a likely driver input, the predictive acceleration system preemptively modifies one or more operating parameters of the vehicle in anticipation of the driver inputs.

As one example, the predictive acceleration system can modify a transmission shifting pattern, and/or preemptively increase engine speed when the system determines that a strong acceleration is likely to occur. In this way, the predictive acceleration system preemptively modifies the operation of the vehicle to improve fuel efficiency, vehicle performance, and/or vehicle safety when an actual acceleration input is received.

Figure 1:
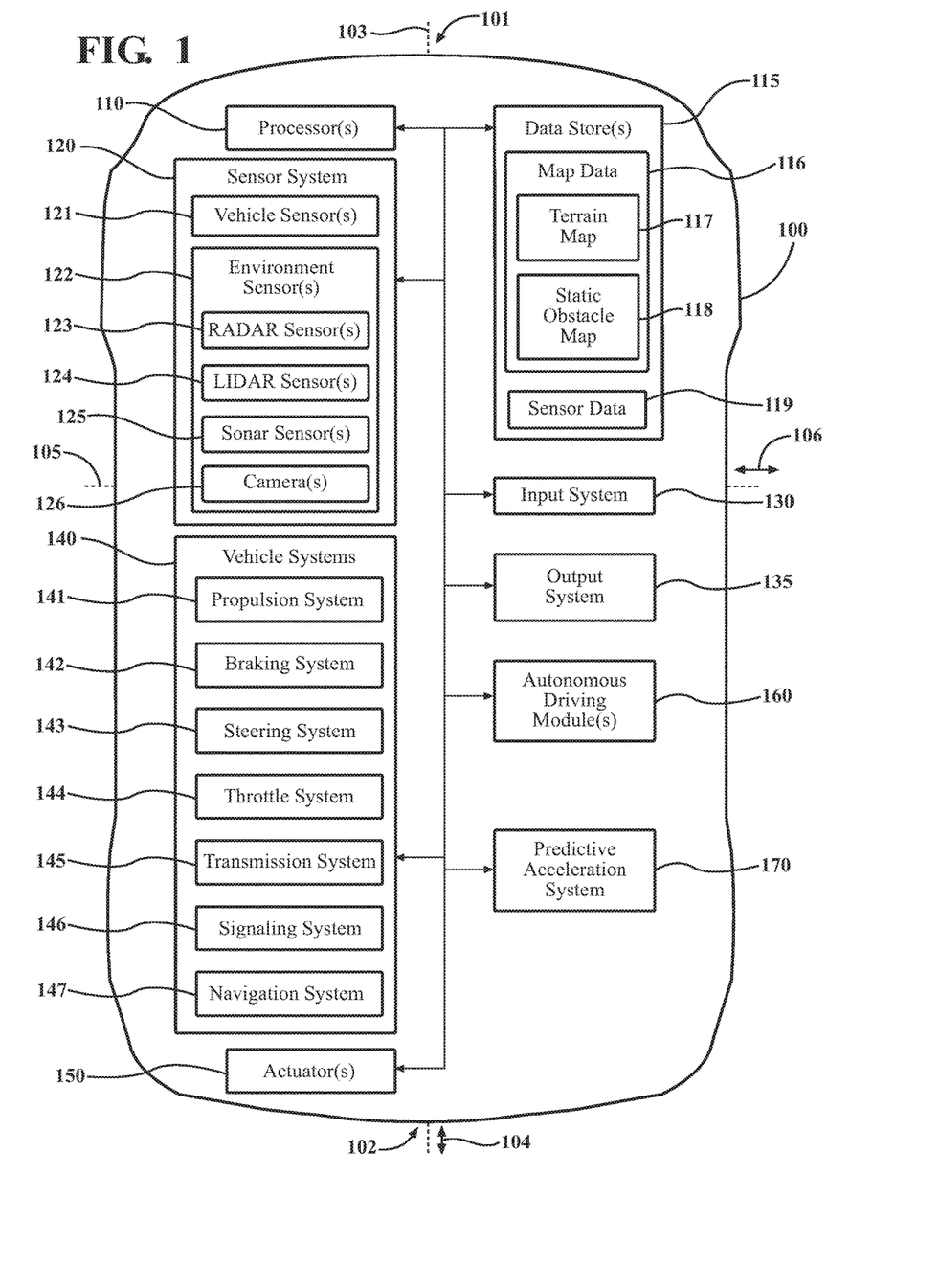
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport with a similarly situation context awareness for preemptively adapting parameters for operating the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced various combinations of these elements.

In either case, the vehicle 100 includes a predictive acceleration system 170 that is implemented to perform methods and other functions as disclosed herein relating to dynamically adjusting one or more vehicle systems 140 within the vehicle 100 to preemptively optimize the vehicle 100 in anticipation of an acceleration input. The noted functions and methods will become more apparent with a further discussion of the figures.

Figure 2:
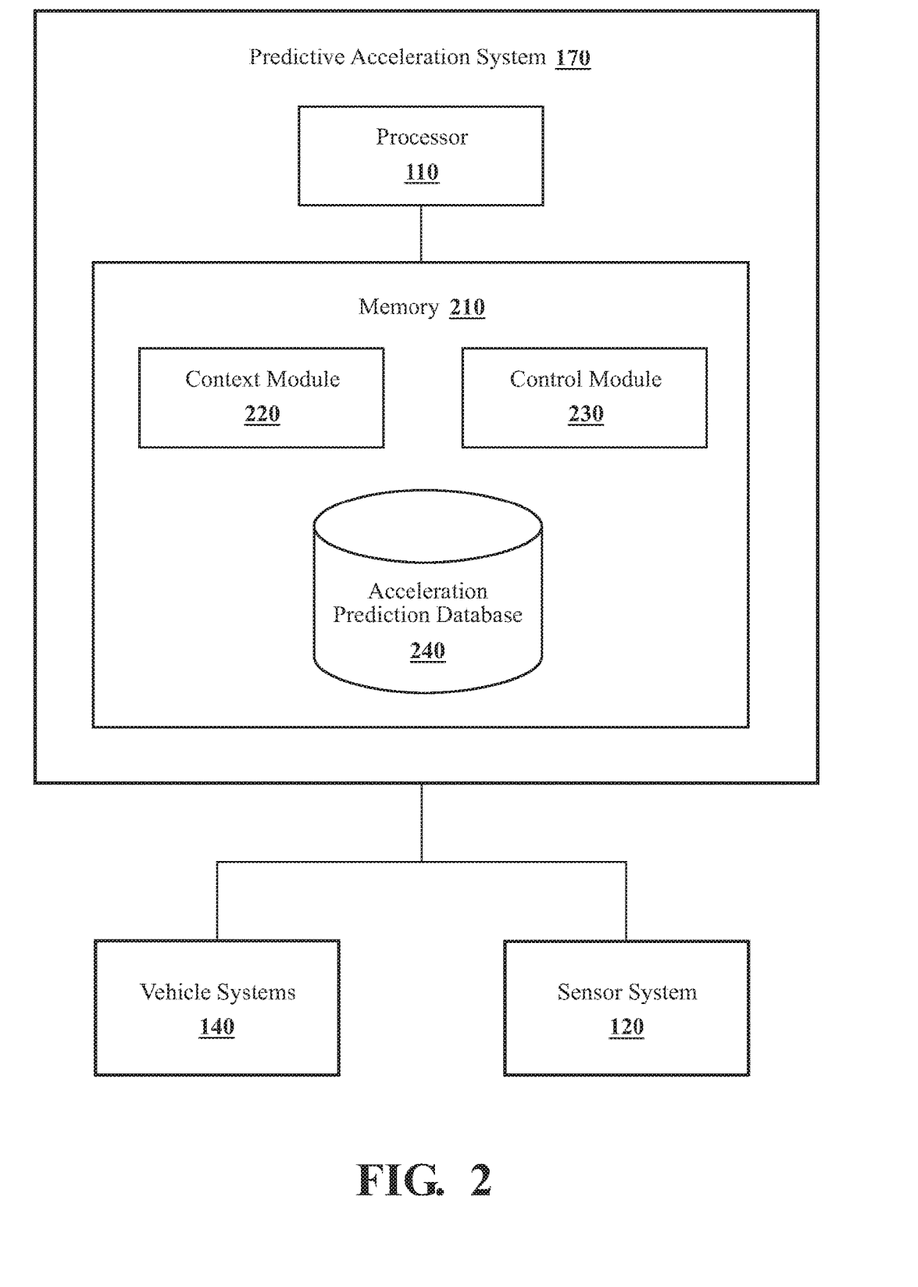
FIG. 2 illustrates one embodiment of a predictive acceleration system that is associated with adjusting operating parameters of a vehicle in anticipation of an acceleration input relating to a lane ahead clearing.

With reference to FIG. 2, one embodiment of the predictive acceleration system 170 of FIG. 1 is further illustrated. The predictive acceleration system 170 is shown as including the processor 110 from the vehicle 100 of FIG. 1. Accordingly, the processor 110 may be a part of the predictive acceleration system 170 or the predictive acceleration system 170 may include a separate processor from the processor 110 of the vehicle 100. In one embodiment, the predictive acceleration system 170 includes a memory 210 that stores a context module 220 and a control module 230. The memory 210 is a random access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the context module 220 generally includes instructions that function to control the processor 110 to retrieve data from sensors of the sensor system 120 and analyze the data to generate an environmental context of the vehicle 100. In other words, the context module 220 includes instructions to identify surroundings (e.g., other vehicles, speed limits, location, road conditions, etc.) and a general context (e.g., current day, current time, route, current segment along a route, etc.) of the vehicle 100 so that when particular circumstances are encountered by the vehicle 100, the control module 230 can proactively optimize the vehicle systems 140.

Accordingly, in one embodiment, the control module 230 includes instructions that function to control the processor 110 to adjust various operating parameters of the vehicle 100 in anticipation of an acceleration input. In other words, instead of waiting for an acceleration input from the driver, the control module 230 preemptively adjusts one or more of the vehicle systems 140 in anticipation of an acceleration input as predicted by the context module 220 using the collected information. Additional aspects of predicting acceleration inputs and preemptively adjusting systems of the vehicle 100 according to the predictions will be discussed subsequently.

With continued reference to the predictive acceleration system 170, in one embodiment, the system 170 includes an acceleration prediction database 240. The acceleration prediction database 240 is, in one embodiment, a complex electronic data structure stored in the memory 210 or another data store and that is configured with routines that can be executed by the processor 110 for analyzing stored data, providing stored data, organizing stored data, and so on. Thus, in one embodiment, the acceleration prediction database 240 stores data used by the modules 220 and 230 in making various determinations. In one embodiment, the acceleration prediction database 240 includes lookup tables of acceleration profiles, travel logs that provide a history of past trips including driving inputs throughout the trips, at least a portion of an environmental context of the vehicle 100, driver information (e.g., ID) and so on.

The acceleration profiles store, for example, expected/predicted acceleration inputs from the driver for the present environmental context. In other words, the acceleration profiles indicate a likely way (e.g., degree and duration) in which the driver will accelerate under the present environmental context. Thus, the acceleration profiles may each indicate a likelihood of acceleration for a particular degree (e.g., amount of accelerator pedal stroke) and duration (i.e., an amount time for which the accelerator pedal is depressed) that correlates with the present environmental context for the driver. As such, the acceleration profiles may be customized particular to a given driver.

In one embodiment, the acceleration profiles are learned from behaviors of the driver. Thus, the context module 220, in one embodiment, monitors driver inputs to the vehicle in relation to different environmental contexts (e.g., location, time of day, the day of the year, traffic, etc.). The context module 220 can store inputs from a driver in a log of the acceleration prediction database 240 along with indicators of the environmental context at the time of the inputs. Subsequently, the context module 220 can apply various statistical methods and/or deep learning methods to the logged data in order to produce the acceleration profiles that characterize expected inputs from the driver under the particular circumstances. In this way, the context module 220 can provide for predicting acceleration inputs from the driver according to a present environmental context. Additionally, the context module 220 can refine the acceleration profiles over time as adjustments are made to the vehicle 100 and outcomes from corresponding acceleration events are logged.

Alternatively, in one embodiment, the acceleration prediction database 240 is programmed with acceleration profiles that are calibrated according to the different contexts and/or according to different demographic segments. In other words, the acceleration profiles may be determined according to a large sample size of drivers for separate environmental contexts in order to characterize expected inputs under different circumstances and according to age, gender, and so on. The acceleration profiles are then stored in the acceleration prediction database 240. For example, the acceleration profiles may be stored according to indicators associated with different environmental contexts so that particular ones of the acceleration profiles can be retrieved according to the present environmental context of the vehicle 100. Still, in a further embodiment, the acceleration profiles may be initially determined and programmed into the acceleration prediction database 240 and then customized/refined over time as patterns of a particular driver are learned through logging provided inputs as different environmental contexts are encountered during operation of the vehicle 100.

In either case, the context module 220 identifies the environmental context (e.g., lane clearing ahead while driving below a posted speed limit) using data collected through the sensor system 120. Additional aspects of the environmental context will be discussed subsequently; however, it should be appreciated that the sensor system 120 from which the data is obtained may include many different possible configurations of sensors. For example, in one embodiment, the sensor system 120 consists of a radar 123. Alternatively, in another embodiment, the sensor system 120 may include cameras 126, sonar 125, LIDAR 124, radar 123, a global position system (GPS) sensor, and so on. Accordingly, depending on a particular assortment of sensors that are implemented in the vehicle 100, and, thus, data from the sensors, the context module 220 can identify the environmental context to varying degrees of granularity.

In one embodiment, the environmental context of the vehicle 100, as determined by the context module 220, indicates an amount of time that the vehicle 100 has been following another vehicle and/or an amount under the speed limit/set cruising speed the vehicle 100 is traveling. Thus, the context module 220 can use this information of the environmental context to characterize a present level of agitation of the driver and thus a predicted degree of acceleration. Furthermore, in one embodiment, the environmental context also indicates a particular location of the vehicle 100 along a route. In other words, the context module 220 may predict a route of the vehicle 100 when no specific destination has been entered into a navigation system. The context module 220 can predict the route of the vehicle by using a current day, time, directional heading and/or other characteristic data of a route to identify the route against, for example, routine routes or other previously traveled routes that are logged in the acceleration prediction database 240. Consequently, the context module 220 can use at least a present location of the vehicle 100 along with knowledge of a predicted route to identify when the vehicle 100 is located proximate to an off-ramp, upcoming intersections of the roadway, upcoming widening of the roadway, and other locations at which a leading vehicle ahead of the vehicle 100 may exit and clear a lane ahead.

The context module 220 can then use the identified environmental context and acceleration profile to preemptively adjust operating parameters of the vehicle 100 in anticipation of receiving an acceleration input that is similar to the accelerator input identified by the acceleration profile. That is, prior to a driver actually depressing an accelerator pedal of the vehicle 100 to generate the accelerator input, the control module 230 adjusts one or more operating parameters of the vehicle 100 to optimize the vehicle 100 for the accelerator input when the control module 230 actually receives the input. In this way, the predictive acceleration system 170 can account for upcoming accelerations prior to an actual occurrence of the accelerations and instead of controlling the vehicle reactively.

Figure 3:
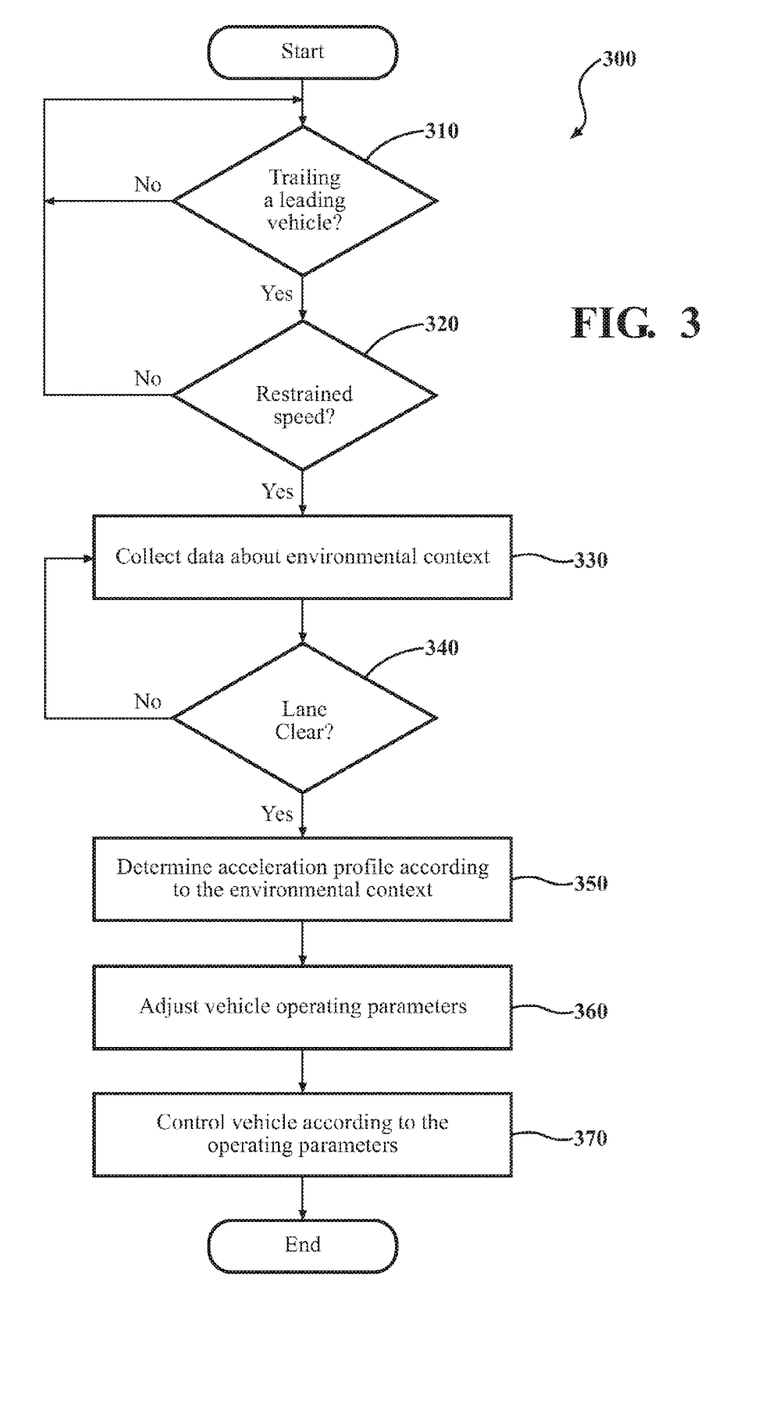
FIG. 3 illustrates one embodiment of a method that is associated with adjusting operating parameters upon detecting a lane clearing and in anticipation of an acceleration input.

Additional aspects of preemptively adjusting the operation of the vehicle 100 will be discussed in relation to FIG. 3. FIG. 3 illustrates a method 300 associated with predicting acceleration inputs from a driver in order to preemptively optimize the vehicle 100. Method 300 will be discussed from the perspective of the predictive acceleration system 170 of FIGS. 1 and 2. Of course, while method 300 is discussed in combination with the predictive acceleration system 170, it should be appreciated that the method 300 is not limited to being implemented within the predictive acceleration system 170, but is instead one example of a system that may implement the method 300.

At 310, the context module 220 detects whether the vehicle 100 is traveling behind a leading vehicle. In one embodiment, the context module 220 analyzes sensor data from at least one sensor of the sensor system 120 to determine whether a leading vehicle is present ahead of the vehicle 100. For example, the context module 220 analyzes a data stream from a forward-facing radar of the vehicle 100 to identify whether a leading vehicle is within defined distance (e.g., 10 m) from the vehicle 100. The defined distance is, for example, a distance ahead of the vehicle 100 within which the vehicle 100 can detect the leading vehicle. Furthermore, the defined distance may be a safe following distance that is defined according to an ability of the vehicle 100 to brake or otherwise maneuver to avoid a collision when the leading vehicle experiences an emergency condition. Thus, in one embodiment, the defined distance may be based on a relative speed between the leading vehicle and the vehicle 100.

Figure 4:
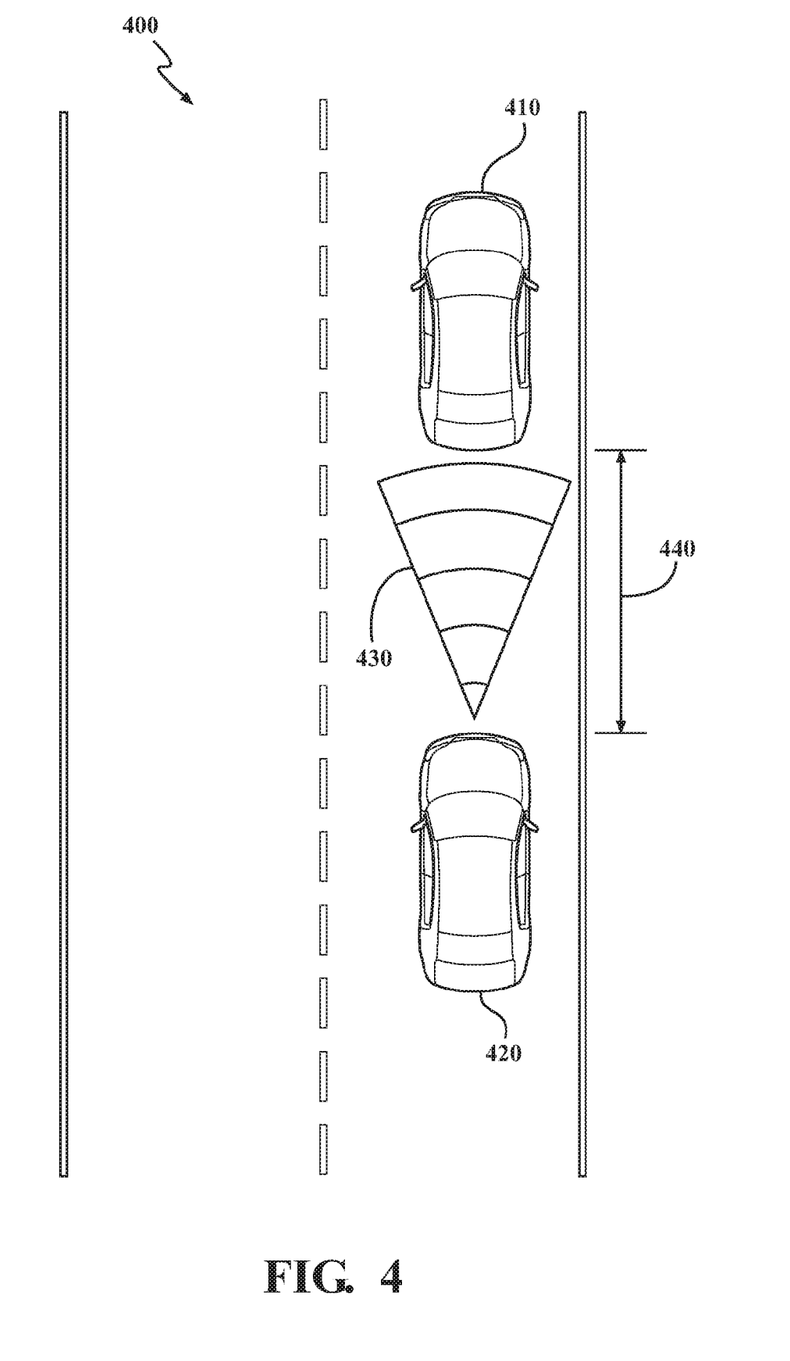
FIG. 4 illustrates an example environmental context including a leading vehicle and a trailing vehicle that includes systems as disclosed herein.

As one example, consider FIG. 4, which illustrates a roadway 400 on which a leading vehicle 410 and a trailing vehicle 420 are traveling. In the provided example, the roadway 400 is a two-lane roadway with one lane of travel in each direction. Furthermore, as shown in FIG. 4, the trailing vehicle 420 uses a radar 430 to detect that the leading vehicle 410 is a defined distance 440 ahead. Of course, while radar is discussed, in alternative implementations, the trailing vehicle 420 may either alternatively or in addition to the radar 430 use stereoscopic cameras, LIDAR, proximity sensors, or other suitable means for detecting the leading vehicle 410.

In either case, at 310, the trailing vehicle 420 detects whether the leading vehicle 410 is present. In further embodiments, additional aspects of the environmental context may also be analyzed by the context module 220 to determine whether the present circumstance correlates with being stuck behind the leading vehicle 410 as opposed to freely driving behind the vehicle 410.

Accordingly, at 320, the context module 220 determines whether a speed of the trailing vehicle 100 is restrained. In one embodiment, the context module 220 compares a current speed of the vehicle 100 with a defined speed that is an intended or expected speed of the vehicle 100. For example, the context module 220 may compare a current speed with a speed that has been set on a cruise control. Alternatively, the context module 220 retrieves a speed limit for a current location from a navigation system, a vehicle-to-infrastructure (V2I) system, or some other means. In still a further embodiment, the context module 220 may a learned speed for a current location or road segment that is a function of past recorded speeds as logged for the driver by the vehicle 100. Whichever defined speed the context module 220 is implemented to use, at 320, the context module 220 compares the current speed with the defined speed to determine whether the current speed is restrained.

In addition to the context module 220 comparing the current speed with the defined speed, the context module 220 may also detect control inputs of the vehicle 100 as indicators that the vehicle 100 is following another vehicle at a restrained speed. That is, in one embodiment, the context module 220 monitors control inputs of the vehicle 100 including a throttle, a brake, and/or steering to detect a speed variance pattern. The speed variance pattern characterizes behaviors of the driver that are indicative of the vehicle 100 unwillingly trailing a leading vehicle. In one embodiment, the context module 220 defines the speed variance pattern according to repetitive accelerations and decelerations in addition to, for example, weaving of the vehicle 100 within a driving lane. In general, the speed variance pattern indicates a desire of the driver to pass the leading vehicle and thus that the vehicle 100 is traveling at a restrained speed. Consequently, if the context module 220 identifies both the presence of the leading vehicle and a restrained speed of the vehicle 100, then the context module 220 proceeds with processing at block 330.

At 330, the context module 220 collects data from sensors of the sensor system 120 to further determine aspects of the environmental context. The environmental context generally defines current surroundings of the vehicle 100 and aspects of how the vehicle is presently operating in addition to, for example, relevant data that occurred immediately previously (e.g., braking and acceleration patterns, etc.). In one embodiment, the context module 220 produces the environmental context as a current location/heading/speed using data from a GPS sensor. In still further embodiments, as previously noted, the context module 220 uses a suite of sensors to collect data about surrounding vehicles (e.g., whether the leading vehicle is following another vehicle, whether a vehicle is next to the vehicle 100), road conditions (e.g., ice, snow, etc.), a location along a predicted or planned route, speed limits, relative speeds of other vehicles (e.g., a leading vehicle in front of the vehicle 100), a distance to an off-ramp, types of surrounding vehicles (e.g., large slowly accelerating vehicles vs quickly accelerating sports cars), a presence of pedestrians and/or bicycles, road grade (degree of incline or degree), road curvature, road type (e.g., gravel, asphalt, etc.), and so on.

In further embodiments, the context module 220 can collect information about the vehicle systems 140 including an engine operating temperature, engine RPM, a battery charge level, current brake force, and other information about a current operating condition of the vehicle 100 that is relevant to predicting an acceleration input. As a further aspect of the environmental context, the context module 220 initiates a timer to record an amount of time the vehicle 100 is behind the leading vehicle. The context module 220 can use the accumulated time subsequently as one indicator of how the driver may accelerate when the leading vehicle moves aside since, in some circumstances, the time indicates a level of agitation for the driver and, thus, a propensity for a strong acceleration.

At 340, the context module 220 identifies whether a lane ahead of the trailing vehicle has cleared of a leading vehicle. In one embodiment, the context module 220 uses the same or similar sensors to detect when the leading vehicle moves, thereby clearing the lane ahead. Of course, the leading vehicle may move from a path of the vehicle 100 in many different ways depending on a roadway and other surrounding factors. In either case, the vehicle 100 resolves whether the leading vehicle has moved or is in the midst of moving to clear the lane ahead at 340.

In one embodiment, the context module 220 continuously monitors data from, for example, a radar sensor of the sensor system 120 to identify an instant when the leading vehicle moves from the lane. Thus, in one example, the context module 220 monitors for a complete movement of the leading vehicle from the lane of travel. In other words, the context module 220 detects when the leading vehicle has cleared the lane in front of the vehicle 100 and, thus, the vehicle 100 may accelerate without colliding with the leading vehicle.

In another embodiment, the context module 220 detects steering movements of the leading vehicle 100 that indicate the leading vehicle 100 is moving aside. For example, the context module 220 can detect when the leading vehicle has maneuvered to a threshold extent from a lane of travel. That is, the context module 220 detects when the leading vehicle is, for example, 30% progressed into an adjoining lane/exit from the roadway. While 30% is provided as a specific example, in other embodiments, the threshold may be programmed according to speed, safety restrictions, and/or other factors of the environmental context.

In still a further embodiment, the context module 220 analyzes movements of the leading vehicle in conjunction with a present location. For example, consider FIG. 5, which illustrates a roadway 500. The roadway 500 is a four-lane highway with two separate lanes of traffic in either direction. The roadway 500 also includes an off-ramp 510. Furthermore, FIG. 5 includes vehicles 520, 530, 540, and 550. For purposes of this example, assume that the vehicle 520 is analogous the vehicle 100 of FIG. 1. Thus, as the vehicles 530 and 520 approach the off-ramp 510, the context module 220 of the vehicle 520 detects a movement of the vehicle 530 toward a berm of the roadway 500. Additionally, using, for example, a GPS sensor, the context module 220 is also aware of a current location and of the off-ramp 510. Thus, the context module 220 proceeds to block 350 upon detecting the upcoming off-ramp 510 in combination with the movement of the vehicle 530 toward the off-ramp 510 by, for example, 30% of a width of the lane.

In further embodiments, the context module 220 analyzes additional roadway features such as a presence of service plazas, pull-offs, climbing lanes, and other aspects of the roadway that may induce a vehicle to change lanes, turn or exit the roadway. In either case, when the context module 220 detects that the lane ahead is clear or clearing, then the context module 220 proceeds to block 350. If the context module 220 does not detect that the lane is clear or clearing, then processing proceeds back to block 330.

At 350, the context module 220 determines an acceleration profile for the vehicle 100. In one embodiment, the acceleration profile indicates a predicted acceleration that is anticipated to be provided by a driver as a function of the environmental context. In one embodiment, the acceleration profile indicates a duration and a degree of an expected/predicted accelerator input that is anticipated to be provided by a driver as a function of the lane ahead of the vehicle 100 clearing.

As previously noted, the acceleration profile may be implemented in several separate ways including as learned accelerations for the driver according to the environmental context, as defined accelerations for different contexts, and so on. Additionally, the plurality of acceleration profiles can be stored in the acceleration prediction database 240 in lookup tables according to metadata that indicates corresponding environmental contexts. Thus, whichever form in which the acceleration profiles are implemented, the context module 220 identifies which of the acceleration profiles is applicable to the present environmental context by, for example, assessing various aspects of the environmental context.

For example, the context module 220 may select an acceleration profile that is specific to the location and particular type of roadway. Thus, the acceleration profile includes, for example, values learned from when the driver has previously accelerated at the same or a similar location. Thus, the context module 220 may parameterize the environmental context and use the parameters as an input to a lookup table in order to obtain the particular acceleration profile. That is, for example, the context module 220 can use a location (longitude and latitude), a context code that identifies the present circumstance (e.g., time following another vehicle), and/or additional parameters (e.g., day, time, weather, etc.) and receive the acceleration profile as an output of the acceleration prediction database 240.

Furthermore, the context module 220 can further analyze the environmental context to identify mitigating factors that are likely to influence an acceleration of the vehicle 100. Thus, the context module 220, in one embodiment, provides parameters identifying the mitigating factors and/or adjusts the acceleration profile to account for the mitigating factors.

Figure 5:
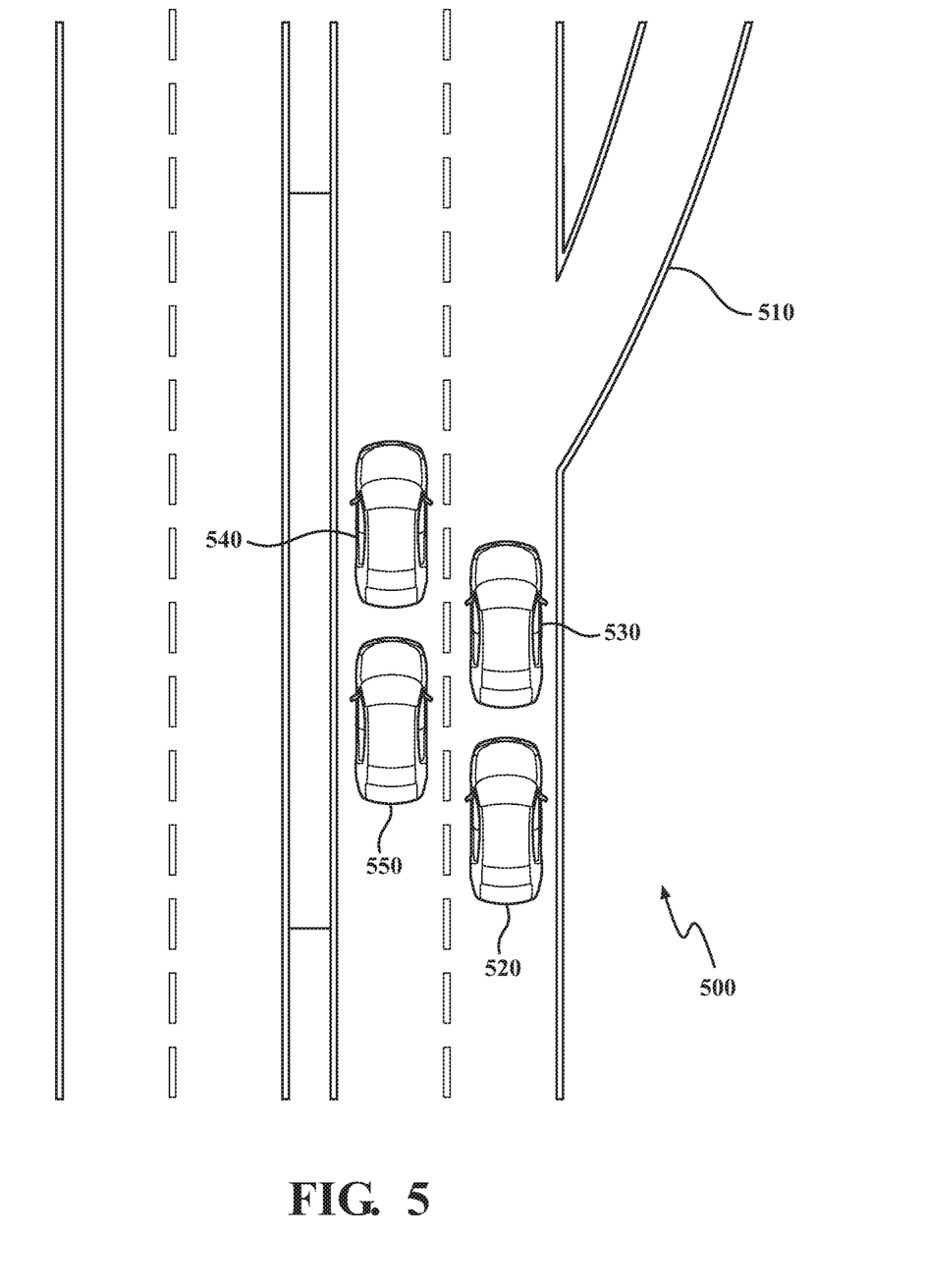
FIG. 5 illustrates an example environmental context including several vehicles traveling along a roadway.

As one example, again consider FIG. 5 from the perspective of the vehicle 520. Assuming that the vehicle 530 exits onto the on-ramp, which is detected at 340, the context module 220 of the vehicle 520 identifies the presence of the vehicles 540 and 550 as part of the environmental context, at 330, and as potential mitigating factors to the acceleration of the vehicle 520. This is because the vehicles 540 and 550 may inhibit an ability of the vehicle 520 to accelerate freely if, for example, the vehicle 540 initiates a lane change in front of the vehicle 520.

As a result of this mitigating characteristic, the context module 220, in one embodiment, provides an indicator of the presence of the vehicles 540 and 550 as an input when determining the acceleration profile. Consequently, the acceleration profile that is identified as a result of the environmental context may indicate an expected/predicted acceleration that is less than what would be expected if the vehicles 540 and 550 were not present. In still a further example, the context module 220 also accounts for relative speeds of the vehicles 540 and 550 in relation to the vehicle 520. Thus, if the vehicles 540 and 550 are traveling at a greater speed than the vehicle 520, then the context module 220 indicates that the vehicles 540 and 550 do not represent a mitigating factor because they are advancing away from the vehicle 520 and, thus, an associated risk is minimized.

In still a further embodiment, the context module 220 also factors an amount of time the vehicle 520 has been following the vehicle 530. In one embodiment, the context module 220 accumulates the time as discussed at 320 according to how long the vehicle 520 has been traveling at a restrained speed behind the leading vehicle whether the leading vehicle is the same vehicle or the leading vehicle changes. The amount of time traveling at the restrained speed is indicative of, for example, how strongly the driver will accelerate once the lane clears. Thus, the time may be provided as an electronic input to contribute to determining the acceleration profile.

In either case, the context module 220 generally analyzes different aspects of the environmental context including mitigating factors such as a speed limit, road conditions, road curvature, types of surrounding vehicles (e.g., cars vs. semi-trucks), a number of lanes, traffic conditions, available fuel/battery charge, and so on when determining the acceleration profile. Consequently, the context module 220 can use many different sensor inputs to help characterize the environmental context and predict a particular type of acceleration that the driver is most likely to undertake for the environmental context. In this way, the predictive acceleration system 170 can optimize the vehicle 100 at 360 to provide improved performance, efficiency, and/or safety when the accelerator input is actually received at 360.

Moreover, the context module 220 may consider any number of the mitigating factors in combination or separately according to available sensors that provide relevant data to detect the mitigating factors. Additionally, some of the mitigating factors of the environmental context may provide information indicating to limit acceleration, while others may indicate unfettered acceleration is feasible. Furthermore, the context module 220, in one embodiment, also identifies an amount of traffic on a highway 500 as a further mitigating characteristic.

Furthermore, in addition to the acceleration profile indicating a likely degree and duration of acceleration, in one embodiment, the acceleration profile also indicates which operating parameters of the vehicle 100 to adjust. For example, depending on a type of the acceleration (e.g., strong vs. efficient) the acceleration profile may indicate different parameters that are to be adjusted. In other words, instead of adjusting an engine of the vehicle 100 to optimize performance for quicker acceleration, the context module 220 selects parameters to optimize fuel/battery efficiency or vice versa. In either case, once the context module 220 identifies the acceleration profile, at 350, the acceleration prediction system 170 proceeds to block 360.

At 360, the control module 230 adjusts the operating parameters of the vehicle 100 according to the acceleration profile. The control module 230 adjusts the operating parameters prior to receiving an acceleration input generated from the driver depressing an accelerator pedal of the vehicle 100. Consequently, the control module 230 adjusts the vehicle 100 preemptively to optimize operating characteristics of the vehicle 100 in anticipation of an acceleration input from the driver that correlates with the predicted/expected acceleration input.

As a general matter, the control module 230 adjusts the operating parameters of the vehicle 100 according to a degree and duration of the expected/predicted acceleration input as identified by the acceleration profile. Additionally, in one embodiment, the operating parameters include control aspects of the vehicle systems 140 that are related to the acceleration of the vehicle. In one embodiment, the operating parameters are values of control registers in an engine control unit (ECU) and/or an onboard computer of the vehicle 100 that are modified by the control module 230 to cause various changes in the operation of the vehicle 100. For example, a non-exhaustive list of different operating parameters that may be preemptively adjusted by the control module 230 is set forth in items (1)-(4).

(1) Engine RPM

Depending on a particular type of the vehicle 100, the control module 230 can adjust the operating parameters in different ways. For example, when the vehicle 100 is a hybrid electric vehicle (i.e., including both combustion and electric motors), the control module 230 can adjust an engine RPM of the combustion engine by engaging an electric motor to drive the RPM of the combustion motor without actually firing (i.e., igniting spark plugs) the combustion engine. Thus, the combustion engine is optimized to respond when an accelerator input is actually received after the combustion engine is primed.

Alternatively, when the vehicle 100 is a fully electric vehicle, the control module 230 can ramp-up an RPM of one or more electric motors while a clutch is disengaged. Once an accelerator input is received, the control module 230 can engage the clutch to the motor that is already ramped-up, thereby providing an optimized performance response.

(2) Maximum Acceleration Rate

From an efficiency perspective, the control module 230 can cap a rate at which the vehicle 100 accelerates so that full acceleration at 100% of a possible rate is not engaged when, for example, attempting to avoid exceeding a speed limit, optimizing fuel efficiency, optimizing the use of battery charge, and so on.

(3) Transmission Shift Patterns

The control module 230 can adjust shift points (i.e., engine RPM values) of an automatic transmission and other aspects of how the transmission operates in order to optimize performance or energy conservation. In one example, the control module 230 automatically downshifts the transmission to provide greater torque when the accelerator input is received.

(4) Maximum Speed

The control module 230 can also limit a maximum speed of the vehicle 100 by preemptively setting a speed at which no additional acceleration is provided even if an accelerator input remains depressed by the driver.

The above examples of adjustments to operating parameters are intended to be exemplary and do not represent a complete listing of possibilities. Of course, it will be appreciated that the spirit of the above-noted examples may extend to other vehicle systems not discussed herein. Furthermore, it should be noted that the adjustments discussed in items (1)-(4) are performed by the control module 230 prior to receiving an accelerator input from the driver depressing an accelerator pedal.

Moreover, the timing of when the control module 230 executes the adjustments at 360 are, for example, according to a learned timing. That is, based on travel logs or other learned information from a history of the vehicle 100, the control module 230 times when the adjustments occur so that, for example, an engine of the vehicle 100 is not operating at a higher RPM for an extended time while waiting for an accelerator input. Alternatively, the control module 230 adjusts the operating parameters according to sensor inputs (e.g., radar detecting leading vehicle changing lanes), according to a timer (e.g., an amount of time after the detected lane change), or another indicator. In this way, the control module 230 preemptively optimizes the operation of the vehicle 100 according to a predicted accelerator input prior to actually receiving the accelerator input. Accordingly, when the control module 230 receives the accelerator input, as expected, the vehicle 100 is prepared to accelerate in an optimized manner for the particular accelerator input.

At 370, the control module 230 controls the vehicle 100 to accelerate according to a received accelerator input. In one embodiment, the control module 230 controls the acceleration according to the operating parameters that were previously adjusted. In some circumstances, the acceleration profile indicates a predicted acceleration input that does not end up correlating with an actual input at 370 and/or the actual acceleration input does correlate with the predicted input, but the actual input cannot be fulfilled because of a lack of battery charge, an intervening circumstance or some other factor. In these instances, the context module 220 logs information about the events and, for example, refines the acceleration profile or generates a further acceleration profile in an attempt to account for the occurrence in the future. In either case, at 370, the control module 230 controls the vehicle 100 to accelerate according to a received accelerator input proactively using the optimized vehicle systems 140 to improve performance, fuel efficiency, and/or safety.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle along a travel route using one or more computing systems to control the vehicle with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle along a travel route.

Furthermore, the vehicle 100 has, for example, a forward/bow end 101 and a rearward/aft/stern end 102. The vehicle 100 has an associated longitudinal axis 103, which can be the central axis of the vehicle 100. The vehicle 100 has an associated longitudinal direction 104. "Longitudinal direction" means any direction that is substantially parallel to and/or co-linear with the longitudinal axis 103. The vehicle 100 has an associated lateral axis 105, which can be substantially perpendicular to the longitudinal axis 103. Additionally, as used herein, a driver's side of the vehicle 100 refers to a port side or left side of the vehicle 100 as viewed from within the vehicle while facing a direction of travel. Moreover, a passenger's side refers to a right-hand side or starboard side of the vehicle. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated continuously, periodically, irregularly, or even randomly to reflect additions, removals, and/or changes within a mapped area.

The one or more data stores 115 can include sensor data 119. In this context, "sensor data" means any information about the sensors that the vehicle 100 is equipped with, including the capabilities, parameters, characteristics, ranges, and other information about such sensors. As will be explained below, the vehicle 100 can include a sensor system 120. The sensor data 119 can relate to one or more sensors of the sensor system 120. As an example, in one or more arrangements, the sensor data 119 can include information on one or more LIDAR sensors 124 of the sensor system 120. Such information can include, for example, the number of outbound sensor signals emitted by the LIDAR or other sensor(s), the maximum working range of one or more of such outbound sensor signals, the arrangement of the outbound sensor signals, the orientation of the outbound sensor signals, and/or the frequency at which the outbound sensor signals are emitted. Such data can be obtained from any suitable source, including a sensor manufacturer, the vehicle manufacturer, and/or based on test data, just to name a few possibilities.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100. The map data 116 and/or the sensor data 119 can be obtained by the vehicle 100 from any suitable source, including a sensor manufacturer, the vehicle manufacturer, and/or based on test data, just to name a few possibilities.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the vehicle 100. In one or more arrangements, the vehicle sensor(s) 121 can include a speedometer (not shown). The speedometer can determine a current speed of the vehicle 100, or data acquired by the speedometer can be used to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect and/or sense something using at least radio signals. The one or more radar sensors 123 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle and/or the movement of each detected obstacle.

In one or more arrangements, the sensor system 120 can include one or more LIDAR sensors 124. "LIDAR sensor" means any device, component and/or system that can detect, and/or sense obstacles using at least lasers. The LIDAR sensor can include a laser source and/or laser scanner configured to emit a laser signal and a detector configured to detect reflections of the laser signal. The one or more LIDAR sensors 124 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

In one or more arrangements, the sensor system 120 can include one or more sonar sensors 125. "Sonar sensor" means any device, component and/or system that can detect, and/or sense something using at least sound waves. The one or more sonar sensors 125 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

The sensor system 120 can include can include one or more cameras 126. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented to capture visual data from at least a portion of the external environment of the vehicle 100. Visual data acquired by the one or more cameras 126 can be used to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions, the elevation of each detected obstacle, the speed of each detected obstacle, and/or the movement of each detected obstacle.

The one or more cameras 126 can be high-resolution cameras. The high resolution can refer to the pixel resolution, the spatial resolution, spectral resolution, temporal resolution and/or radiometric resolution. In one or more arrangements, the one or more cameras 126 can be high dynamic range (HDR) cameras or infrared (IR) cameras. The one or more cameras 126 can capture visual data in any suitable wavelength on the electromagnetic spectrum.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100, and/or one or more sensors can be located so as to be exposed to the exterior of the vehicle 100.

The sensor system 120 can include one or more ranging sensors. "Ranging sensors" include sensors that can detect, and/or sense obstacles from a distance and do not require physical contact with the obstacle. The various environment sensors 122 described above are examples of ranging sensors. Alternatively, or in addition to one or more of the above examples, one or more sensors can be configured to detect, and/or sense the location of the vehicle 100 and/or the location of obstacles in the environment relative to the vehicle 100. Any suitable sensor can be used for such purposes. Such sensors may work independently and/or in combination with a positioning system of the vehicle 100.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed. A general description of the operation of a LIDAR sensor 124 is shown in FIG. 2. However, it will be understood that the description is applicable to other environment sensors 122.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle passenger (e.g. a person, a vehicle passenger, etc.). The output system 135 can present information/data to a vehicle passenger. The output system 135 can include a display. Alternatively, or in addition, the output system 135 may include a microphone, earphone, and/or speaker. Some components of the vehicle 100 may serve as both a component of the input system 130 and a component of the output system 135.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A predictive acceleration system of a trailing vehicle, comprising:
   one or more processors;
   a memory communicably coupled to the one or more processors and storing:
      a context module including instructions that when executed by the one or more processors cause the one or more processors to, in response to identifying, using at least one sensor of the trailing vehicle, that a lane ahead of the trailing vehicle has cleared of a leading vehicle, determine an acceleration profile for the trailing vehicle that indicates a predicted acceleration that is anticipated to be provided by a driver as a function of an environmental context, wherein the environmental context characterizes at least current surroundings of the trailing vehicle; and
      a control module including instructions that when executed by the one or more processors cause the one or more processors to preemptively adjust, using a processor to modify electronic values of one or more control registers in the trailing vehicle, operating parameters of the trailing vehicle according to the acceleration profile prior to receiving an acceleration input from the driver to optimize the trailing vehicle in anticipation of the acceleration input from the driver that correlates with the predicted acceleration, and
      wherein the control module includes instructions to control the trailing vehicle to accelerate based, at least in part, on the operating parameters upon receiving the acceleration input.

2. The predictive acceleration system of claim 1, wherein the context module includes instructions to detect that the trailing vehicle is following the leading vehicle by analyzing sensor data from the at least one sensor to identify whether the leading vehicle is present ahead of the trailing vehicle, and by determining that a speed of the trailing vehicle is restrained while traveling behind the leading vehicle, and wherein the context module includes instructions to receive the sensor data as a data stream from a forward-facing radar of the trailing vehicle.

3. The predictive acceleration system of claim 2, wherein the context module includes instructions to determine that the speed of the trailing vehicle is restrained including instructions to (i) compare a current speed of the trailing vehicle to a defined speed at which the trailing vehicle is intended to be traveling, and (ii) detect control inputs of the trailing vehicle that indicate a speed variance pattern.

4. The predictive acceleration system of claim 1, wherein the context module includes instructions to identify the lane ahead has cleared including instructions to monitor whether the leading vehicle is moving from the lane in relation to a current segment of a roadway on which the leading vehicle is traveling as identified by the environmental context, and
   Wherein the control module includes instructions to preemptively adjust the operating parameters to modify operation of at least one vehicle system prior to receiving and in anticipation of the acceleration input from the driver.

5. The predictive acceleration system of claim 1, wherein the context module includes instructions to collect data from the at least one sensor of the trailing vehicle to identify the environmental context including at least a current location of the trailing vehicle, a presence of additional vehicles proximate to the trailing vehicle, and a speed limit, wherein the at least one sensor includes at least a global position system (GPS) sensor and a radar,
   wherein the context module includes the instructions to collect the data including instructions to, in response to identifying that the trailing vehicle is traveling behind the leading vehicle, initiate a timer to accumulate an amount of time the trailing vehicle is traveling behind the leading vehicle, and wherein the environmental context includes a current day and a current time.

6. The predictive acceleration system of claim 1, wherein the context module includes the instructions to determine the acceleration profile including instructions to select the acceleration profile from a plurality of acceleration profiles as a function of the environmental context, wherein the plurality of acceleration profiles each correlate with separate environmental contexts including at least an amount of time the trailing vehicle has been following the leading vehicle, and
   wherein the acceleration profile indicates a degree of acceleration and a duration of acceleration that is predicted to be provided by the driver for the environmental context.

7. The predictive acceleration system of claim 1, wherein the control module includes the instructions to adjust the operating parameters including instructions to modify operation of at least one vehicle system prior to receiving the acceleration input and to preemptively control the trailing vehicle to operate in a way that prepares the trailing vehicle for the acceleration input,
   wherein the operating parameters include parameters to ramp-up an output of a powertrain of the trailing vehicle, and to limit an amount of throttle produced from the accelerator input, and wherein the control module includes the instructions to control the trailing vehicle upon receiving the acceleration input including instructions to accelerate the trailing vehicle using the operating parameters that have been optimized to improve operation of the trailing vehicle.

8. The predictive acceleration system of claim 1, wherein the trailing vehicle is a hybrid electric vehicle, and wherein the control module includes instructions to adjust the operating parameters by activating an electric motor of the trailing vehicle to increase an rpm of a combustion engine without firing the combustion engine.

9. A non-transitory computer-readable medium storing instructions that when executed by one or more processors cause the one or more processors to:
   in response to identifying, using at least one sensor of a trailing vehicle, that a lane ahead of a trailing vehicle has cleared of a leading vehicle, determine an acceleration profile for the trailing vehicle that indicates a predicted acceleration that is anticipated to be provided by a driver as a function of an environmental context, wherein the environmental context characterizes at least current surroundings of the trailing vehicle;
   preemptively adjust, using a processor to modify electronic values of one or more control registers in the trailing vehicle, operating parameters of the trailing vehicle according to the acceleration profile prior to receiving an acceleration input from the driver to optimize the trailing vehicle in anticipation of the acceleration input from the driver that correlates with the predicted acceleration; and
   control the trailing vehicle to accelerate based, at least in part, on the operating parameters upon receiving the acceleration input.

10. The non-transitory computer-readable medium of claim 9, further comprising:
  instructions to detect that the trailing vehicle is following the leading vehicle by analyzing sensor data from the at least one sensor to identify whether the leading vehicle is present ahead of the trailing vehicle, and by determining that a speed of the trailing vehicle is restrained while traveling behind the leading vehicle, wherein the instructions to detect the leading vehicle include instructions to receive the sensor data as a data stream from a forward-facing radar of the trailing vehicle, and
  wherein the instructions to determine that the speed of the trailing vehicle is restrained including instructions to (i) compare a current speed of the trailing vehicle to a defined speed at which the trailing vehicle is intended to be traveling, and (ii) detect control inputs of the trailing vehicle that indicate a speed variance pattern.

11. The non-transitory computer-readable medium of claim 9, wherein the instructions to identify that the lane ahead has cleared include instructions to monitor whether the leading vehicle is moving from the lane in relation to a current segment of a roadway on which the leading vehicle is traveling as identified by the environmental context, and
  wherein the instructions to preemptively adjust the operating parameters include instructions to modify operation of at least one vehicle system prior to receiving and in anticipation of the acceleration input from the driver and to preemptively control the trailing vehicle to operate in a way that prepares the trailing vehicle for the acceleration input.

12. The non-transitory computer-readable medium of claim 9, further comprising:
  instructions to collect data from the at least one sensor of the trailing vehicle to identify the environmental context including at least a current location of the trailing vehicle, a presence of additional vehicles proximate to the trailing vehicle, and a speed limit, wherein the at least one sensor includes at least a global position system (GPS) sensor and a radar,
  wherein the instructions to collect the data include instructions to, in response to identifying that the trailing vehicle is traveling behind the leading vehicle, initiate a timer to accumulate an amount of time the trailing vehicle is traveling behind the leading vehicle, and wherein the environmental context includes a current day and a current time.

13. The non-transitory computer-readable medium of claim 9, wherein the instructions to determine the acceleration profile include instructions to select the acceleration profile from a plurality of acceleration profiles as a function of the environmental context, wherein the plurality of acceleration profiles each correlate with separate environmental contexts including at least an amount of time the trailing vehicle has been following the leading vehicle, and
  wherein the acceleration profile indicates a degree of acceleration and a duration of acceleration that is predicted to be provided by the driver for the environmental context.

14. A method of preemptively adjusting operating parameters of a trailing vehicle, comprising:
  in response to identifying, using at least one sensor of the trailing vehicle, that a lane ahead of the trailing vehicle has cleared of a leading vehicle, determining an acceleration profile for the trailing vehicle that indicates a predicted acceleration that is anticipated to be provided by a driver as a function of an environmental context, wherein the environmental context characterizes at least current surroundings of the trailing vehicle;
  preemptively adjusting, using a processor to modify electronic values of one or more control registers in the trailing vehicle, the operating parameters of the trailing vehicle according to the acceleration profile prior to receiving an acceleration input from the driver to optimize the trailing vehicle in anticipation of the acceleration input from the driver that correlates with the predicted acceleration; and
  controlling the trailing vehicle to accelerate based, at least in part, on the operating parameters upon receiving the acceleration input.

15. The method of claim 14, further comprising:
  detecting that the trailing vehicle is following the leading vehicle by analyzing sensor data from the at least one sensor to identify whether the leading vehicle is present ahead of the trailing vehicle, and by determining that a speed of the trailing vehicle is restrained while traveling behind the leading vehicle, and
  wherein analyzing the sensor data includes receiving the sensor data as a data stream from a forward-facing radar of the trailing vehicle.

16. The method of claim 15, wherein determining that the speed of the trailing vehicle is restrained includes (i) comparing a current speed of the trailing vehicle to a defined speed at which the trailing vehicle is intended to be traveling, and (ii) detecting control inputs of the trailing vehicle that indicate a speed variance pattern that correlates with intentions of the driver to pass the leading vehicle.

17. The method of claim 14, wherein identifying the lane ahead has cleared includes monitoring whether the leading vehicle is moving from the lane in relation to a current segment of a roadway on which the leading vehicle is traveling as identified by the environmental context, and
  wherein preemptively adjusting the operating parameters modifies operation of at least one vehicle system prior to receiving and in anticipation of the acceleration input from the driver.

18. The method of claim 14, further comprising:
  collecting data from the at least one sensor of the trailing vehicle to identify the environmental context including at least a current location of the trailing vehicle, a presence of additional vehicles proximate to the trailing vehicle, and a speed limit, wherein the at least one sensor includes at least a global position system (GPS) sensor and a radar,
  wherein collecting the data includes, in response to identifying that the trailing vehicle is traveling behind the leading vehicle, initiating a timer to record an amount of time the trailing vehicle is traveling behind the leading vehicle, and
  wherein the environmental context includes a current day and a current time.

19. The method of claim 14, wherein determining the acceleration profile includes selecting the acceleration profile from a plurality of acceleration profiles as a function of the environmental context, wherein the plurality of acceleration profiles each correlate with separate environmental contexts including at least an amount of time the trailing vehicle has been following the leading vehicle, and
  wherein the acceleration profile indicates a degree of acceleration and a duration of acceleration that is predicted to be provided by the driver for the environmental context.

20. The method of claim 14, wherein adjusting the operating parameters controls the trailing vehicle to modify operation of at least one vehicle system prior to receiving the acceleration input and to preemptively control the trailing vehicle to operate in a way that prepares the trailing vehicle for the acceleration input,    wherein the operating parameters include parameters to ramp-up an output of a powertrain of the trailing vehicle, and to limit an amount of throttle produced from the accelerator input, and wherein controlling the trailing vehicle according to the operating parameters upon receiving the acceleration input includes accelerating the trailing vehicle using the operating parameters that have been optimized to improve operation of the trailing vehicle.

* * * * *